E. A. ATWOOD & H. H. BODWELL.

Wind-Mills.

No. 5,656. Reissued Nov. 18, 1873.

Witnesses:

W. W. Dodge.

Alex Mahon

Inventors:

E. A. Atwood

H. H. Bodwell, by Dodge & Son

Attys.

AM. PHOTO-LITHOGRAPHIC Co. N.Y. (OSBORNE'S PROCESS)

UNITED STATES PATENT OFFICE.

EPHRAIM A. ATWOOD AND HARRY H. BODWELL, OF SAN FRANCISCO, CAL.

IMPROVEMENT IN WINDMILLS.

Specification forming part of Letters Patent No. 142,885, dated September 16, 1873; reissue No. 5,656, dated November 18, 1873; application filed November 1, 1873.

*To all whom it may concern:*

Be it known that we, EPHRAIM ARUNA ATWOOD and HARRY HORTON BODWELL, of the city and in the county of San Francisco and State of California, have invented certain new and useful Improvements in Windmills; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Our invention relates to certain improvements in windmills; and it consists, first, in a novel mechanism by which the hinged tail or rudder of the mill is turned from a position in a line with or parallel to the axis of the wind-wheel to any desired angle with this line, up to a right angle, and at the same time locked in such position without any other special locking device. This enables us to throw the wheel into or out of the wind to a greater or less degree, as required. The turning and locking device for the tail is operated by an endless cord passing over two vertical pulleys, one upon the shaft of the worm or screw, and the other conveniently situated near the ground.

Figure 1:
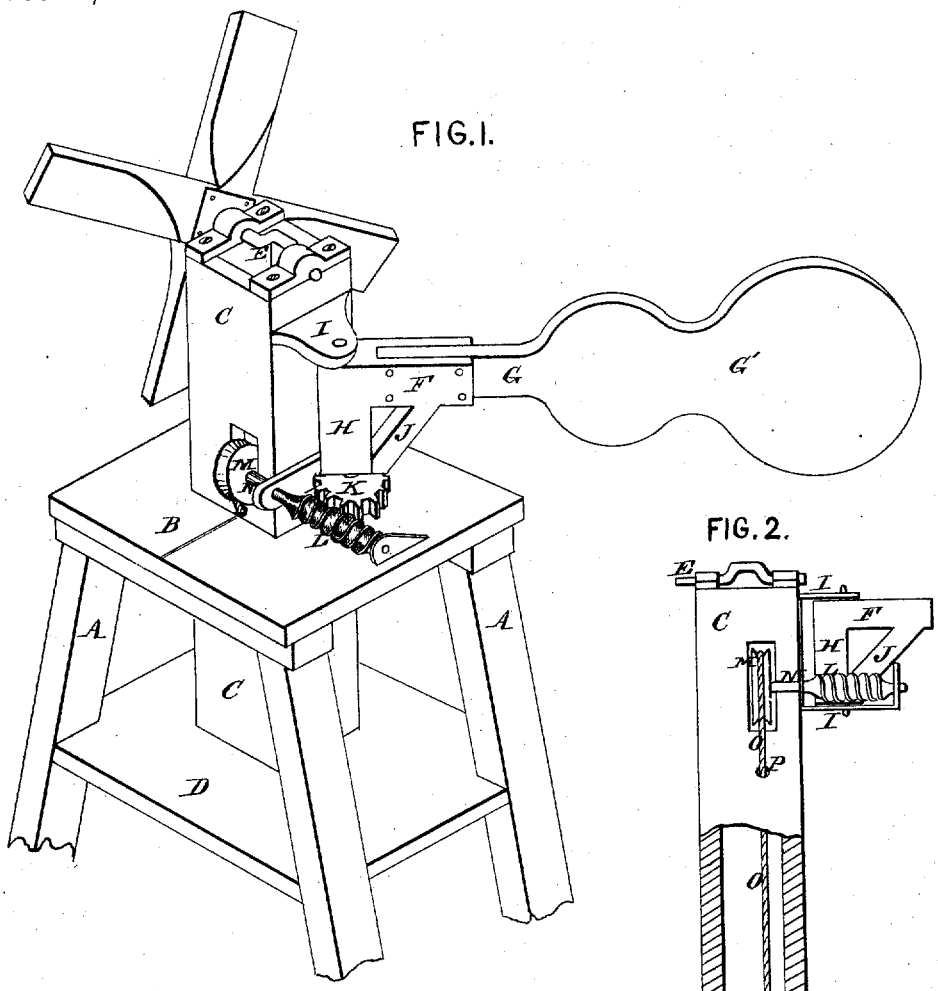
Figure 2:
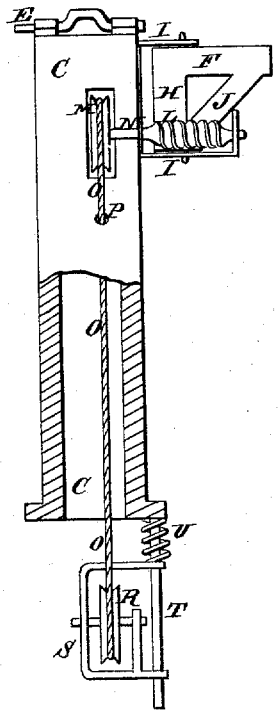
Figure 3:
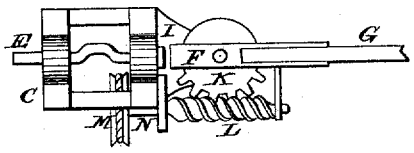

Referring to the accompanying drawings for a more complete explanation of our invention, Figure 1 is a perspective view of our mill. Fig. 2 is a sectional elevation. Fig. 3 is a plan or top view.

A is the supporting-frame of a windmill, having the upper platform, B, through which the hollow post C passes and turns about its axis, being supported by a step on the platform or cross-beams at D. The axis or shaft E of the wind-wheel turns in boxes at the top of this post C, the crank standing above the opening in the post, through which the pump-rod passes. At the side of the post opposite to the wind-wheel the shoe which supports the inner end of the tail or rudder is hinged. This shoe is ordinarily of cast-iron, and has a trough or socket in its horizontal portion, F, into which the wooden beam G of the tail is secured. A vertical arm or part of the shoe, H, extends downward beside the post C, and pintles at the top and bottom of this arm support the shoe, turning in sockets in the plates I, as shown. The shoe is strengthened and braced by the arm J of the casting, the whole thus making a firm, strong support for the tail or rudder G′. At the bottom of the shoe is secured the spur-gear or segment K, which lies horizontally, and at one side of the plate I and the post C are journal-boxes, in which the screw or worm L is supported, so as to mesh with the teeth of the segment K.

By turning this worm, it is manifest that the segment will also be turned gradually around, and thus swing the shoe and the tail or rudder.

It will also be seen that this construction makes a complete lock for the rudder, as the the worm will hold the segment at any point where it may be stopped.

In order to operate this mechanism more conveniently, and from the ground, a pulley, M, is secured to the end of the shaft N of the worm, one edge of the pulley turning through a slot through the post C, so that the endless cord O, which passes over it, will pass up through the inside of the post. The other side of the cord also enters the post through an opening, P, above the platform B, so that the two parts of the cord will pass down inside of the post, and not interfere with its turning about upon its axis as the wind-wheel changes its position. A friction-pulley or idler serves to relieve the rope where it passes through the hole P. Below the step on which the post C is supported is another vertical-grooved pulley, R, around which the rope O passes, this pulley being hung in a block or frame, S, so as to be conveniently near to the ground. A guide-rod, T, suitably placed, prevents the pulley-frame from turning around, and thus twisting the rope. In order to compensate for the lengthening and contracting of the rope O, a spring, U, or a weight, is made to give it the proper tension.

By this construction, we are enabled to greatly cheapen and simplify our mill, as by the use of the worm-gear the tail can be easily turned, and at the same time locked in any position.

Having thus described our invention, what we claim as new, and desire to secure by Letters Patent, is—

1. The worm L and the segment K, for the purpose of turning the tail to any position and locking it, substantially as herein described.

2. In combination with the worm L and the segment K, the vertical pulleys M and R and the endless rope O, for the purpose of operating the rudder from the ground, substantially as herein described.

3. In combination with the pulley R and adjusting-spring U, the guide-rod T, to prevent twisting, substantially as herein described.

4. The shoe, consisting of the body or upright H, with the horizontal arm F and the brace J, as a means of supporting and hinging the tail G′, substantially as described.

In testimony that we claim the foregoing we have hereunto set our hands and seals this 17th day of October, 1873.

EPHRAIM ARUNA ATWOOD. [L. S.]
HARRY HORTON BODWELL. [L. S.]

Witnesses:
F. O. WEGENER,
ADOLPHUS G. RUSS.